United States Patent [19]

von Widdern et al.

[11] Patent Number: 5,356,676
[45] Date of Patent: Oct. 18, 1994

[54] COEXTRUDED BIAXIALLY STRETCHED TUBULAR FILM

[75] Inventors: Michael H.-C. von Widdern, Walsrode; Gunter Weber, Fallingbostel, both of Fed. Rep. of Germany

[73] Assignee: Wolff Walsrode AG, Walsrode, Fed. Rep. of Germany

[21] Appl. No.: 931,175

[22] Filed: Aug. 17, 1992

[30] Foreign Application Priority Data

Aug. 23, 1991 [DE] Fed. Rep. of Germany ....... 4128082
Sep. 13, 1991 [DE] Fed. Rep. of Germany ....... 4130485

[51] Int. Cl.$^5$ .............................................. A22C 13/00
[52] U.S. Cl. .................................. 428/34.8; 426/105; 426/127; 428/34.9; 428/35.7; 428/36.7; 428/332; 428/474.7; 428/475.8; 428/910
[58] Field of Search ............... 428/516, 47, 36.1, 34.8, 428/474.4, 34.9, 35.7, 36.7, 332, 475.8, 910; 426/105, 127

[56] References Cited

U.S. PATENT DOCUMENTS

| | | |
|---|---|---|
| 4,243,724 | 6/1981 | Strutzel et al. |
| 4,640,852 | 2/1987 | Ossian . |
| 4,683,170 | 1/1987 | Tse et al. ............................ 428/474.4 |
| 4,892,765 | 1/1990 | Hisazumi ............................. 428/34.8 |
| 5,219,002 | 7/1993 | Stenger ............................... 428/34.8 |

FOREIGN PATENT DOCUMENTS

| | | |
|---|---|---|
| 0183512 | 11/1985 | European Pat. Off. . |
| 2527166 | 6/1975 | Fed. Rep. of Germany . |
| 2724253 | 5/1977 | Fed. Rep. of Germany . |
| 1510115 | 6/1975 | United Kingdom . |
| 2035198 | 6/1980 | United Kingdom ............... 428/34.8 |

OTHER PUBLICATIONS

Derwent, of JP-A-4 115 926.
Derwent, of JP-A-4 131 237.
Derwent, of JP-A-54 031 489.

*Primary Examiner*—Edith Buffalow
*Attorney, Agent, or Firm*—Sprung, Horn, Kramer & Woods

[57] ABSTRACT

This invention relates to a coextruded, biaxially stretched tubular film for durable and crease-free wrapping of goods packaged in a liquid or pasty state, in particular foodstuffs such as sausage meat for boiling or cooking and cream cheese, which are heated treated during and/or after the packaging process.

16 Claims, No Drawings

COEXTRUDED BIAXIALLY STRETCHED TUBULAR FILM

This invention relates to a coextruded, biaxially stretched tubular film for the durable and crease-free wrapping of goods packaged in a liquid or pasty state, in particular foodstuffs such as sausage-meat for boiling and cooking and cream cheese.

Wrappings for foodstuffs such as sausage-meat or other goods packaged by the same or similar processes must fulfil numerous requirements if they are to be suitable for use.

These requirements are as follows:

a) Recovery power

Both cooling of the previously heated packaged material and the weight loss due to evaporation of water during storage are accompanied by a reduction in volume of the packaged goods. The film must continue to cling without creasing to the contents of the package regardless of the reduction in volume in order to preserve the attractive, saleable appearance of the goods.

b) Strength

The material to be packaged is forced at high speed into the tubular film under a filling pressure of up to 1.6 bar. After the application of pressure, the material of the film should not bulge due to localised expansion nor have undergone any significant increase in diameter. The quality of the film must ensure that the high filling pressure mainly produces an elastic deformation of the tubular film.

c) Temperature resistance

The wrapping must be able to tolerate temperature/tension so that it will withstand the pressure applied by the contents without excessive deformation even during the cooking process.

d) Barrier properties

The tubular film intended for use inter alia as skin for sausages which are to be boiled or otherwise cooked must have good barrier properties against permeation by oxygen and water vapour.

The oxygen barrier prevents premature greying of the sausage-meat facing the inside of the film.

The barrier against water vapour prevents the weight loss due to evaporation of water from the contents, which would not only reduce the saleable value of the product but could also produce unsightly creases due to the loss in volume.

e) Adherence between the film and meat

The tubular film is required to have so called meat adherence if it is to be used as skin for sausage which is to be boiled or cooked. By "meat adherence" is meant the capacity of the covering to adhere to the contents. The affinity between the covering and the contents prevents the deposition of jelly.

f) Gathering into folds

Before the tubular film is subjected to industrial processing in automatic filling machines, it is formed into a gathered tube. In this process, the tubular film is folded along the axis of the tube and then compressed in a ratio of from 30:1 to 60:1. The film must be able to withstand the extremely high buckling stress without suffering damage.

g) Compliance with food regulations

The product must, of course, only contain materials which are classified as harmless by the food product regulations and recommendations.

h) Ecology

The product should only be composed of materials which are ecologically harmless in their manufacture, processing and use as well as in their subsequent disposal as waste.

No biaxially stretched tubular films of thermoplastic resins have hitherto been known which fulfil all these the extensive requirements in every point. The progressive reduction in the use of packaging materials containing chlorine forces the manufacturer and processor of synthetic sausage skins made of VDC/VC copolymers to offer alternative packaging materials. Since the stretched film of VDC/VC copolymer was able to fulfil the requirements of "strength", "oxygen barrier", "water vapour barrier" and "meat adherence" with only one polymer, the manufacturers of the films were prepared to pay a relatively high price for the VDC/VC copolymer as raw material. Further development of the coextrusion technique, on the other hand, now enables the combination of polymer properties in the coextrusion composition to be realised with less expensive polymers.

The manufacturer of tubular films is interested in reliable and inexpensive means of producing a product which satisfies the quality requirements of the user, on the one hand to reduce the wastage rate as far as possible and provide a reproducible quality of film and on the other hand to offer a highly refined product at a low cost.

The known process for the manufacture of biaxially stretched tubular films is composed of the following process steps:

Plastication of the thermoplastic polymers

Conversion of the melt into the tubular form

Rapid cooling of the molten primary tube to a solid state in order to suppress the formation of crystallites as far as possible Reheating of the primary tube to a suitable temperature for biaxial stretching Biaxial stretching of the reheated primary tube by application of a pressure difference between the interior of the tube and the surroundings of the tube and by the application of a longitudinal pull to assist stretching in the longitudinal direction Thermofixing of the biaxially stretched tubular film Rolling up of the tubular film Various finishing steps depending on the subsequent use of the film (e.g. cutting, printing, gathering, etc.).

Biaxial stretching is understood by the man of the art to be the transverse and longitudinal stretching of the thermoplastic extrudate at temperatures from the glass transition temperature to the melting temperature. Biaxial stretching may be carried out by means of, for example, a bladder filled with a cushion of gas or fluid under pressure and enclosed gas-tightly or fluid-tightly between two pairs of rollers rotating at different speeds. Whereas the ratio of the differing circumferential roller speeds corresponds to the degree of longitudinal stretching, the degree of transverse stretching is calculated from the ratio of the diameter of the tube in the stretched state to its diameter in the unstretched state. The increase in surface area due to stretching is the product of the degree of longitudinal stretching multiplied by the degree of transverse stretching.

During the stretching process, the molecules of the tubular film which is in the solid state align themselves in such a manner that the modulus of elasticity and the strength are considerably increased.

A tubular film is sufficiently strong if, when used as a packaging skin, it undergoes mainly elastic deformation during the filling process and during sterilization. The skin must preserve its cylindrical form and must not bulge out or curve.

Biaxial stretching of tubular films of partially crystalline thermoplastic polymers such as polyamide or polyvinylidene chloride requires rapid cooling of the molten primary tube because the developing crystalline superstructure would otherwise interfere with the subsequent biaxial stretching. This obstruction to biaxial stretching is recognised in practice by the presence of an agitated stretching bladder, i.e. the neck of the bladder travels in alternating directions along the axis of the tube, with the result that the diameter of the tubular end product is not uniform.

Plentiful advice and information is given in the Patent literature for the processing of partially crystalline aliphatic polyamide (PA) to form biaxially stretched films and the subsequent use of the latter as skin for cooking and boiling sausages. The advice given includes both technical solutions for the manufacturing process of the biaxially stretched tubular films and developments of formulations for obtaining improved properties for practical application.

DE 2 850 181 indicates that improved stretching can be obtained by the addition of olefinic copolymers to the PA. According to the information given by the Patentee, this is recognised by an optically clearly visible increase in the uniformity of the stretching bladder and by a considerable reduction in the stretching forces required.

The water vapour barrier of films having a PA matrix can be substantially improved by the addition of olefinic (co-)polymers or other polymers which are less permeable to water vapour than aliphatic polyamides. Compared with skins of PVDC copolymers, however, the water vapour barrier must be regarded as insufficient and therefore requiring improvement. In the processing of polymer blends, difficulties frequently arise in obtaining a constant quality of product since the distribution of the components of the blend in the matrix has an important influence on the stretching capacity and the barrier properties. Owing to the fact that the quality of the distribution depends on a very large number of parameters of the process (e.g. viscosities of the components of the blend, processing temperatures, rates of stretching, geometry of the screw, etc.), a reproducible quality of product is extremely difficult to obtain.

The improvement obtained in the water vapour barrier of single layered tubes of PA film by employing the technique of blending results from the incorporation of the components of the blend over a flat area in the PA matrix. The size of the incorporated areas is influenced in particular by the degree of biaxial stretching of the film.

The components thus incorporated over an area do not form a complete layer of film and therefore cannot reduce the permeation by water vapour to the same extent as is possible by employing the coextrusion technique. For a given quantity of material used, therefore, a substantially improved water vapour barrier is obtained by using the coextrusion technique. This provides both economical and ecological advantages.

Similar procedures are described in documents EP 0 216 094 and DE 3 801 344.

According to EP 0 216 094, an improved oxygen barrier combined with high permeability to substances carrying smoke flavours can be obtained by the addition of ethylene vinyl alcohol copolymers (EVOH) to the PA. In addition to the difficulties outlined above of obtaining a reproducible quality of product, the inadequate temperature stability of EVOH results in unwanted degradation of the EVOH when mixed with polyamides, which are processed at a high temperature.

DE-OS 3 801 344 describes a biaxially stretched tubular film of a ternary blend. Whereas most of the weight of the film is due to aliphatic PA, proportions of polyterephthalic acid esters and aromatic PA are also added. According to the Applicant, the object of this structure of blend is to produce a homogeneous distribution of colour pigment in the film, which can be achieved by the preparation of a coloured master batch containing the aromatic PA and subsequently mixing this with the other components.

This structure of film, like all other single-layered films based on aliphatic polyamides mentioned above, fails to fulfil the requirements of the producers for reliable reproducibility as well as the requirements of the processor for a high barrier effect against the permeation of water vapour and oxygen.

If the quality of tubular film demanded by the user is to be obtained under economically and ecologically favourable conditions, this can only be achieved with coextruded stretched tubular films.

Japanese Application J 1 014 032 describes a biaxially stretched coextruded tubular film of three layers as skin for boiling and cooking sausages, in which the outer layer facing away from the contents consists of an aliphatic PA and the inner layer consists of an ethylene/acrylic acid copolymer. The middle layer of PP- and PE-copolymers between the outer and the inner layer serves as bonding medium. The inner polymer layer of ethylene/acrylic acid copolymer assumes the function of meat adherence. According to a subsequent application, GB 2 205 273, the meat adherence of the internal layer of LLDPE is improved by an expensive corona pre-treatment acting on the inside of the tubular film.

It was an object of the present invention to provide the user with an ecologically acceptable biaxially stretched tubular film with improved barrier action and improved properties for use.

The present invention relates to a coextruded, biaxially stretched tubular film for covering goods that are to be packaged in the liquid or pasty state, in particular foodstuffs, which film in its filled state covers its contents without creasing and remains free from any visible effect from oxygen for a considerable period of storage due to its barrier action against water vapour and oxygen, and the inner layer of which film, facing the contents, has meat adherence, characterised in that the film consists of at least 3 layers comprising at least 1 layer of aliphatic polyamide as outer layer,
a middle layer of at least 1 oxygen-blocking layer of EVOH, (partially) aromatic polyamide or aliphatic PA and
an inner layer of at least one water vapour blocking layer of olefinic (co)polymers having the property of adhering to the contents.

The high barrier action against oxygen and water vapour results from the combination of the barrier properties of the individual polymer layers, the interfaces of the individual layers and the molecular superstructure due to the manufacturing technique entailing biaxial stretching and thermofixing, and it does not require the additional incorporation of chlorine-containing barrier layers of PVC or PVDC.

In a preferred embodiment, the amides used are Polyamide-6 or copolyamides containing a predominant proportion of caprolactam. These polyamides may be processed alone or as a polymer mixture with one another or as a polymer mixture with other polymers, e.g. with aromatic polyamides, PE(copolymers), PP(copolymers), polyesters, etc. with a predominant proportion of PA.

In a preferred embodiment, the layer of aliphatic PA is arranged as the outer layer (1) of the tubular film.

In a particularly preferred embodiment, the thickness of the outer PA layer is from 15 to 35 μm.

The inner layer (3) of the tubular film according to the invention consists of olefinic copolymer. In addition to its meat adherence, this layer may perform part of the function of water vapour barrier. In a particularly preferred embodiment, this layer consists of an ionomer resin as this type of polymer is particularly effective in preventing the deposition of jelly between the skin and the packaged meat. Further, the inner layer of olefinic copolymer enables the ends of the tubular film to be sealed right through the higher melting layers. This possibility may be employed in particular when the tubular film is supplied to the processor as cut goods with each piece sealed at one end. This layer must, like all the other layers present in addition to the aliphatic polyamide, satisfy the requirements of the manufacturer of the film as regards capacity for biaxial stretching so that it can be processed and in particular biaxially stretched at the parameters dictated by the PA.

The middle or core layer (2) of the tubular film according to the invention consists of EVOH-copolymers, (partially) aromatic PA or aliphatic PA. This layer in particular has the function of oxygen barrier.

Bonding layers may be inserted between layers (1)–(2) and (2)–(3). These bonding layers have a chemical and/or physical affinity for the adjacent layers so that their bonding action is preserved even after the process of biaxial stretching and after cooking. PE and PP copolymers containing functional groups are particularly suitable for this purpose.

The bonding layers also perform the function of an additional water vapour barrier. In particular when EVOH is used as oxygen barrier layer, the encapsulation shielding against water vapour on both sides provides an improvement in the oxygen barrier under conditions of high atmospheric moisture.

Penetration of oxygen causes greying of the meat product on the surface of the boiling or cooking sausage visible to the consumer. Advanced greying produces an appearance which makes the product less saleable; this is particularly noticeable when goods differing in their manufacturing date lie side-by-side on the shelf.

In practice, tubular coverings are watered before being processed in high speed automatic filling machines. The object of this step, apart from wetting the surface of the tubular covering, is to improve the flexibility by the absorption of water. Tubular films of thermoplastic materials also undergo this treatment, inter alia in order to "soften" water-absorbent polymers by the incorporation of water. In the case of polyamides, the region of glass transition temperature can be lowered to below 0° C. by the absorption of water.

In the tubular film according to the invention, the layer of aliphatic PA is arranged as outer layer to ensure undisturbed absorption of water during the watering process.

EXAMPLES

The examples given below were realised on a coextrusion line for 5-layered tubes. Plastication and homogenisation of the polymers used was carried out with 5 separate extruders.

In cases in which the composite film was formed by only 4 polymer layers (with varying functions), 2 identical types of polymer were placed side-by-side.

EXAMPLE 1

Polymers (A), (B), (C) and (D) were plasticized and homogenised by 5 extruders and converted into the tubular form by means of a 5-layer coextrusion die.

Viewed from the outside to the inside, the tubular film has the structure: A1/B/C/B/D.

Polymer A1 is a Polyamide 6 (B40 F of Bayer AG),
Polymer B has the function of a bonding agent (HV) and is a PE-copolymer,
Polymer C is an ethylene/vinyl alcohol copolymer (EVAL EP ethylene/vinyl alcohol copolymer (EVAL EP F101 BZ of Kuraray Company), and
Polymer D is an ionomer resin with zinc ionomers (Surlyn 1650 of DuPont).

The tubular coextrudate leaving the die is chilled with water at 10° C. both from the outside and from the inside. The cooling water in the interior of the tube is squeezed off by a tightly closing pair of rollers. This pair of rollers at the same time performs the function of withdrawing the melt from the die. Complete removal of the residual moisture from the outer surface of the primary tube is carried out by means of a mechanical stripping device and an air jet. The unstretched primary tube thus obtained has a diameter of 20 mm and the following distribution of layer thicknesses from the outside to the inside:

A1=250 μm, B=100 μm, C=50 μm, B=100 μm, D=50 μm.

After the primary tube has been reheated to 95° C., it is stretched 3.3-fold in the transverse direction and 3.0-fold in the longitudinal direction by the inclusion of an air bladder between two pairs of rollers rotating at different circumferential speeds.

The biaxially stretched tubular film passes for 15 seconds through a heat treatment zone adjusted to 160° C. (thermofixing), again between two gas-tightly sealing pairs of rollers, shrinkage being largely prevented by a cushion of gas under pressure acting from inside. The biaxially stretched, heat-treated tubular film thus obtained has a total layer thickness of 58 μm.

The fluctuation in the width of the flattened tubular film is less than 1.4 mm over a period of observation of 30 minutes.

During the subsequent tests for performance of the product in use, the tubular film is filled with liver sausage paste after 10 minutes' storage in water maintained at 20° C. and is then boiled for 45 minutes at 75° C., put under a jet of cold water and then completely cooled in a cold storage house. The tubular film forms a smooth, tight wrapping round the sausage-meat and has good meat adherence properties.

The weight losses due to evaporation of water over a storage period of 20 days amount to 0.2% by weight. The liver sausage meat undergoes no visible greying on the side facing the film.

The film can easily be peeled off its contents in a spiral.

EXAMPLE 2

The structure of the film is almost identical to that of Example 1 but no bonding layer is placed between the outer PA layer and the layer of EVOH. The structure is therefore: A1/C/B/D/D.

A primary tube having the following distribution of layer thicknesses is produced by the same procedure as in Example 1:

A1=250 μm, C=50 μm, B=100 μm, D=50 μm, D=100 μm.

The biaxially stretched, heat-treated tubular film has a total thickness of 58 μm.

The fluctuation in width of the tubular film when laid out flat is less than 1.2 mm over a period of observation of 30 minutes.

During the subsequent test for performance in use, this film structure produces the same good results as that of Example 1. The bond between the PA layer and the EVOH layer satisfies the requirements arising from biaxial stretching and the procedures employed in use even when no HV is employed.

EXAMPLE 3

In Examples 3 and 4, a layer of (partially) aromatic polyamide is used in place of the core layer of EVOH.

The tubular film has the following structure from the outside to the inside: A2/B/E/B/D.

Polymer A2 is a copolyamide 6.66 (Ultramid C35 of BASF AG),

Polymer B has the function of a bonding agent (HV) and is a PE copolymer,

Polymer E is a (partially) aromatic polyamide (Nyref N-MXD6 of Solvay) and

Polymer D is an ionomer resin with zinc ionomers.

A primary tube having the following distribution of layer thicknesses is produced by the same process as in Example 1:

A2=250 μm, B=100 μm, C=50 μm, B=100 μm, D=50 μm.

After the primary tube has been reheated to 95° C., it is stretched 3.4-fold in the transverse direction and 3.1-fold in the longitudinal direction by the inclusion of an air bladder between two pairs of rollers rotating at different circumferential speeds.

The biaxially stretched tubular film passes for 15 seconds through a heat treatment zone adjusted to 160° C. (thermo-fixing) between two gas-tightly sealing pairs of rollers, and shrinkage is to a large extent prevented by a cushion of gas under pressure acting from inside. The biaxially stretched heat treated tubular film thus obtained has a total layer thickness of 54 μm.

The fluctuation in width of the film when laid out flat is less than 1.4 mm over a period of observation of 30 minutes.

During the subsequent comparative testing for performance in use, this structure of film provides the same good results as those of Examples 1 and 2.

EXAMPLE 4

The film structure is almost identical to that of Example 3 but without the insertion of a bonding agent between the outer layer of PA and the "core layer" of (partially) aromatic PA. The structure is therefore: A2/E/B/D.

The primary tube has the following distribution of layer thicknesses:

A2=250 μm, E=50 μm, B=50 μm, D=100 μm, D=100 μm.

The biaxially stretched, heat-treated tubular film has a total layer thickness of 55 μm. The fluctuations in width of the tubular film when laid out flat is less than 1.5 mm over a period of observation of 30 minutes.

The subsequent comparative test for performance in use provides results equal to those of the preceding Examples. The bond between the outer layer of aliphatic PA and the "core layer" of (partially) aromatic PA satisfies the requirements arising from biaxial stretching and the procedures in use even without HV.

We claim:

1. A coextruded, biaxially stretched tubular film for covering goods packaged in the liquid or pasty state which undergo a heat treatment after filling the tubular film consisting of at least three layers, comprising
    as the outer layer at least one layer of an aliphatic polyamide,
    as the core layer at least one oxygen barrier layer of an ethylene/vinyl alcohol copolymer or a partially aromatic polyamide, and
    as the inner layer at least one water vapor barrier layer of an olefinic polymer having the property of adherence to a filling.

2. A tubular film according to claim 1, wherein the outer polyamide layer comprises an aliphatic polyamide selected from the group consisting of polyamide 6, polyamide 66, polyamide 11, polyamide 12, 66, polyamide 6.66, polyamide 6.8, 6.9, polyamide 6.10, polyamide 6.11, 6.12, a copolymer of the monomer units contained therein or a mixture of the said aliphatic polyamides.

3. A tubular film according to claim 1, wherein the outer polyamide layer consists of a polymer mixture containing, in addition to the aliphatic polyamide, a total of 5 to 30% by weight based on the total weight of the polymer mixture, of
    a partially aromatic polyamide, or
    an acid-modified, olefinic copolymer which is partially compatible with the polyamide matrix, or
    a mixture of a partially aromatic polyamide and a partially compatible, acid-modified, polyolefinic copolymer.

4. A tubular film according to claim 1, wherein the outer polyamide layer has a layer thickness of from 10 to 35 μm.

5. A tubular film according to claim 1, wherein the inner layer facing the filling consists of polyethylene or polypropylene, a mixture thereof or copolymers of the monomer units contained therein.

6. A tubular film according to claim 1, wherein the inner layer facing the filling consists of an ionomer polymer.

7. A tubular film according to claim 1, wherein the layer containing the olefinic polymer has a layer thickness of from 10 to 30 μm.

8. A tubular film according to claim 1, wherein the core layer comprises an ethylene/vinyl alcohol copolymer wherein the vinyl alcohol units constitute 40 to 80 mol-% of the copolymer.

9. A tubular film according to claim 1, wherein the core layer comprises an aromatic polyamide produced